Feb. 26, 1963 E. JEDRZYKOWSKI 3,078,656
GOVERNOR MECHANISM FOR HYDROSTATICALLY DRIVEN VEHICLE
Filed Oct. 28, 1960 5 Sheets-Sheet 2
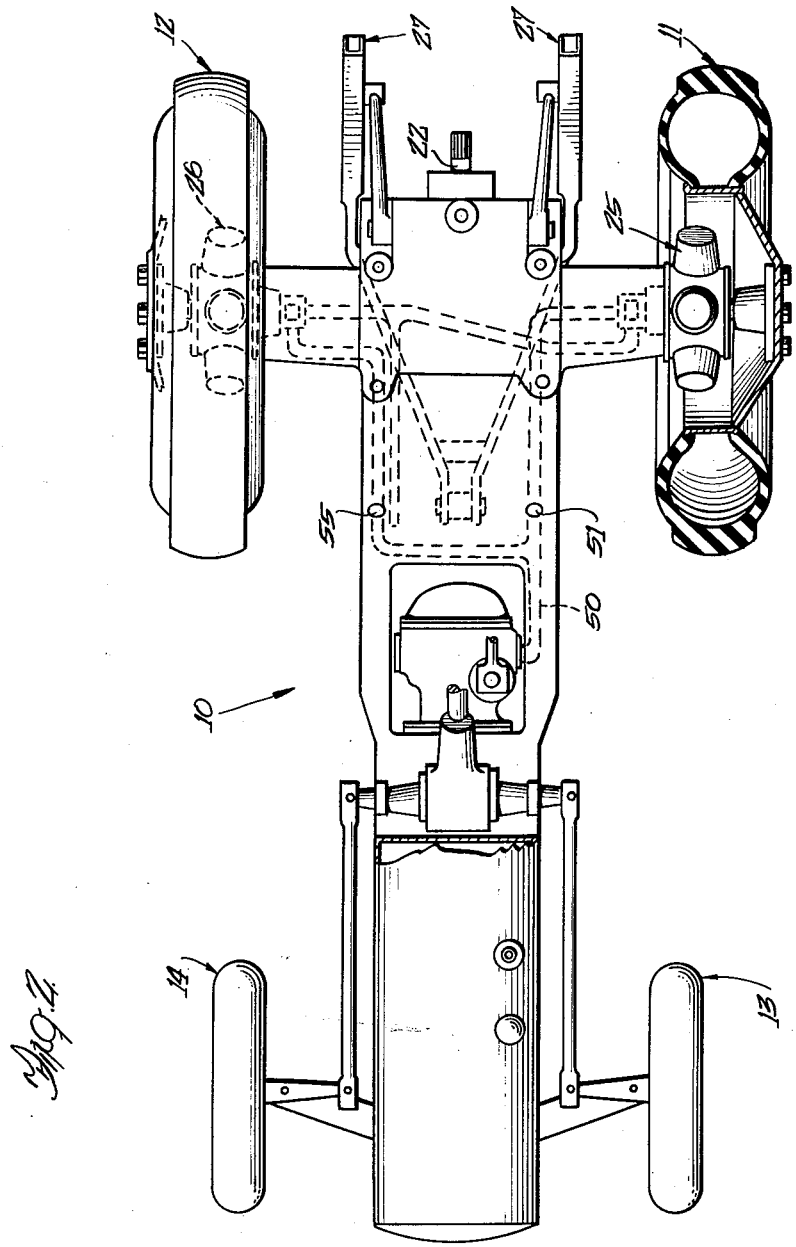
INVENTOR
Edmund Jedrzykowski
Paul O. Pippel
ATTORNEY

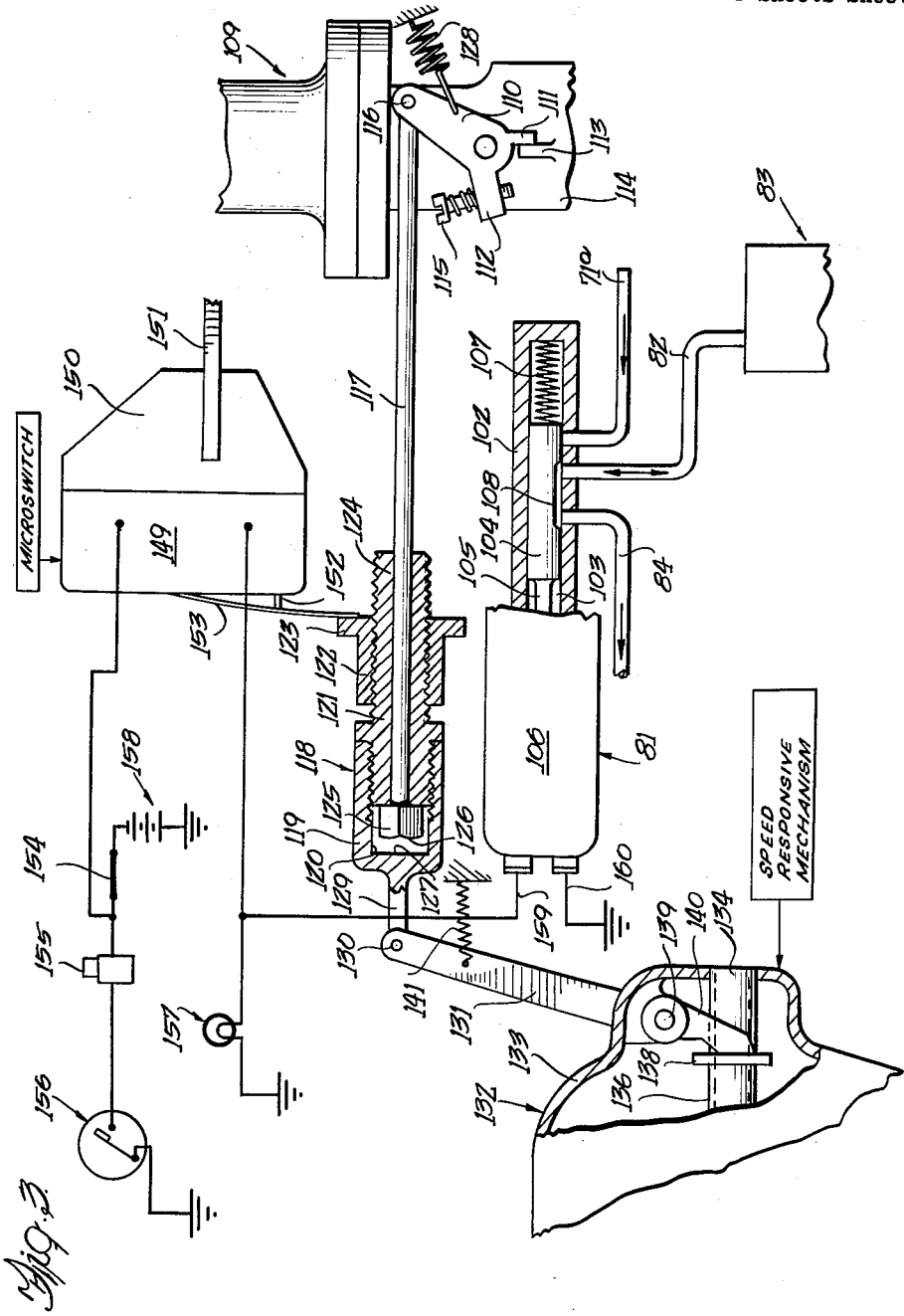

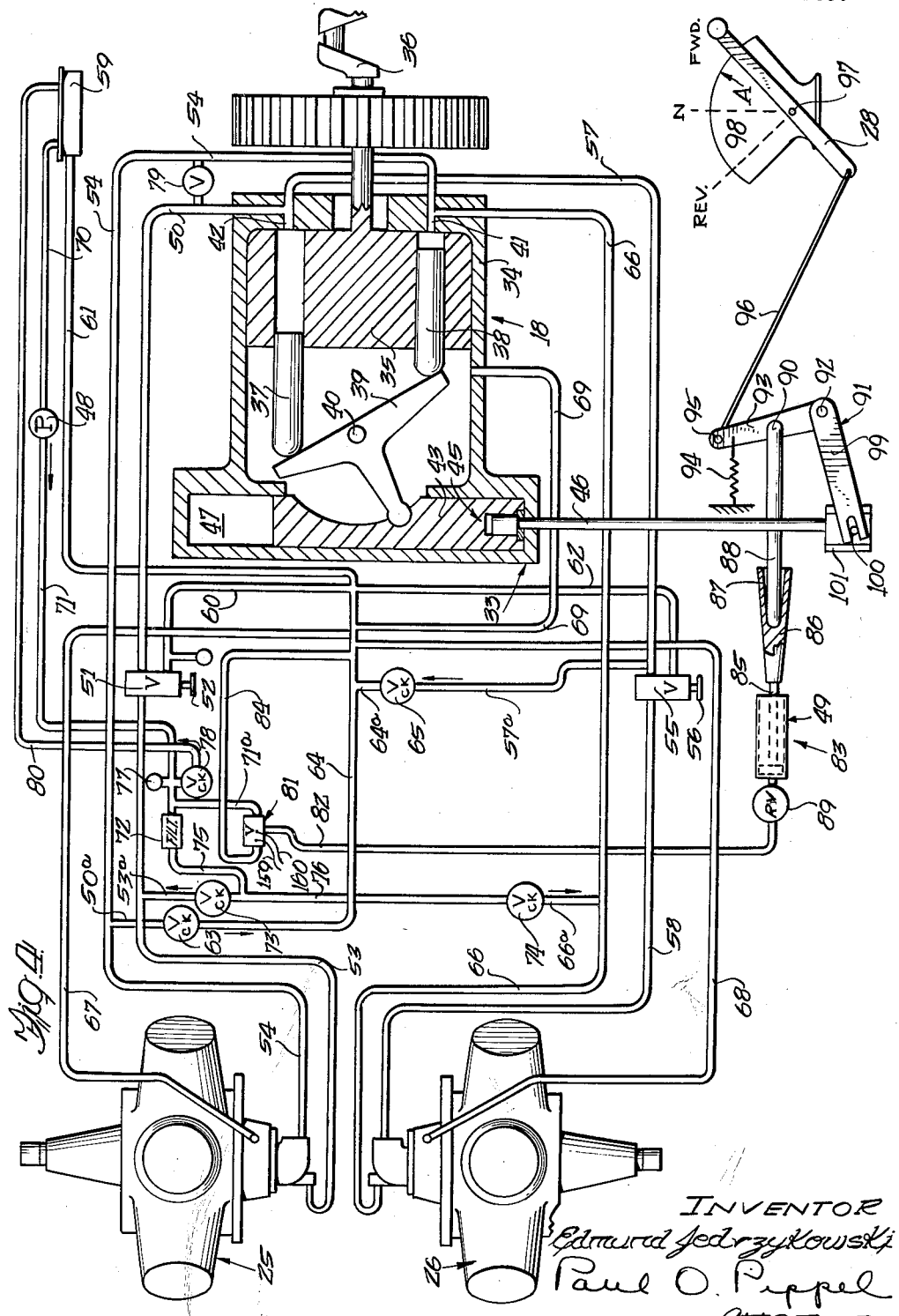

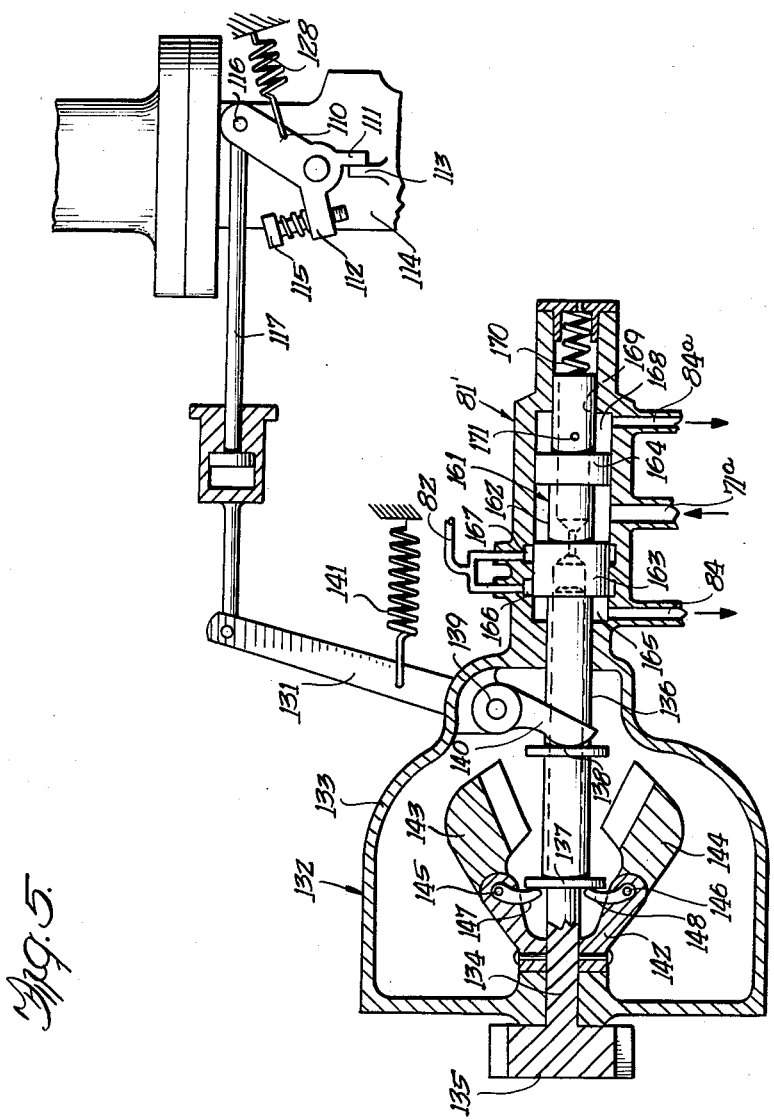

United States Patent Office 3,078,656
Patented Feb. 26, 1963

3,078,656
GOVERNOR MECHANISM FOR HYDROSTATICALLY DRIVEN VEHICLE
Edmund Jedrzykowski, Chicago, Ill., assignor to International Harvester Company, Chicago, Ill., a corporation of New Jersey
Filed Oct. 28, 1960, Ser. No. 65,676
10 Claims. (Cl. 60—19)

This invention relates to a governor mechanism adapted to regulate both fuel and load on an engine so that the speed of the engine is maintained in the proximate range of its maximum power output. More in particular this invention relates to a governing mechanism for automatically controlling the speed of propulsion of a hydrostatically driven vehicle such as a tractor.

It is well known that the power delivered by an internal combustion engine, such as a conventional gasoline or diesel engine, increases as its speed increases until maximum power output is reached and conversely the power output of an engine decreases with reduction of speed. A further increase in speed above the optimum results progressively in lower power output. Thus it is apparent that in order to obtain maximum power output of an internal combustion engine the speed of the engine must be maintained at a predetermined value as above described.

From the above it is seen that when load is applied to an engine the throttle must be correspondingly opened to prevent the engine from slowing down below the predetermined maximum output speed. However, if the applied load to the engine increases beyond its throttle control limit, the engine speed diminishes to below that of maximum power output. A prime object of the present invention is to provide a governor mechanism adapted to maintain a predetermined engine speed which automatically adjusts the engine's throttle in accordance with varying loads applied to the engine.

Another prime object of the invention is to provide a governor mechanism which automatically reduces the load applied to an engine when the engine is overloaded thereby allowing the engine to maintain its optimum speed for maximum power output.

A further object of this invention is to provide a governor mechanism for automatically controlling the engine's throttle and applied load whereby under varying load conditions the speed of the engine is maintained at a rate approximately equal to the optimum speed for obtaining the maximum power output of the engine.

A still further object of the invention is to provide a vehicle having a hydrostatic power drive transmission in combination with an automatic governing mechanism whereby the speed of the engine is maintained at substantially a predetermined constant irrespective of variations in loading and overloading conditions applied to the vehicle.

Another important object of the invention is an engine governor mechanism for a hydrostatic driven vehicle for controlling automatically the engine throttle when the engine is loaded below its maximum power output and for reducing automatically the engine load when overload condition is approached.

A yet further object of this invention is a governor mechanism for utilizing the maximum power output of an engine at its maximum efficiency.

These and other desirable objects inherent and encompassed by the invention will become more apparent from the ensuing description, the appended claims and the annexed drawings wherein:

FIGURE 2 is a top elevation of the hydrostatic driven tractor in FIGURE 1, partly in section and partly broken away, showing additional details of the vehicle not apparent from FIGURE 1.

FIGURE 3 illustrates partly in section and partly broken away, the engine speed sensitizing means of the governor mechanism for controlling the engine throttle mechanically and the load on the engine electromechanically.

FIGURE 4 is a schematic drawing of the hydrostatic transmission of the vehicle of FIGURES 1 and 2 adapted for control by the sensitizing means of FIGURE 3.

FIGURE 5 illustrates, partly in section and partly broken away, a modified form of the sensitizing means shown in FIGURE 3 whereby both the throttle and load control are entirely mechanical.

Figure 1:
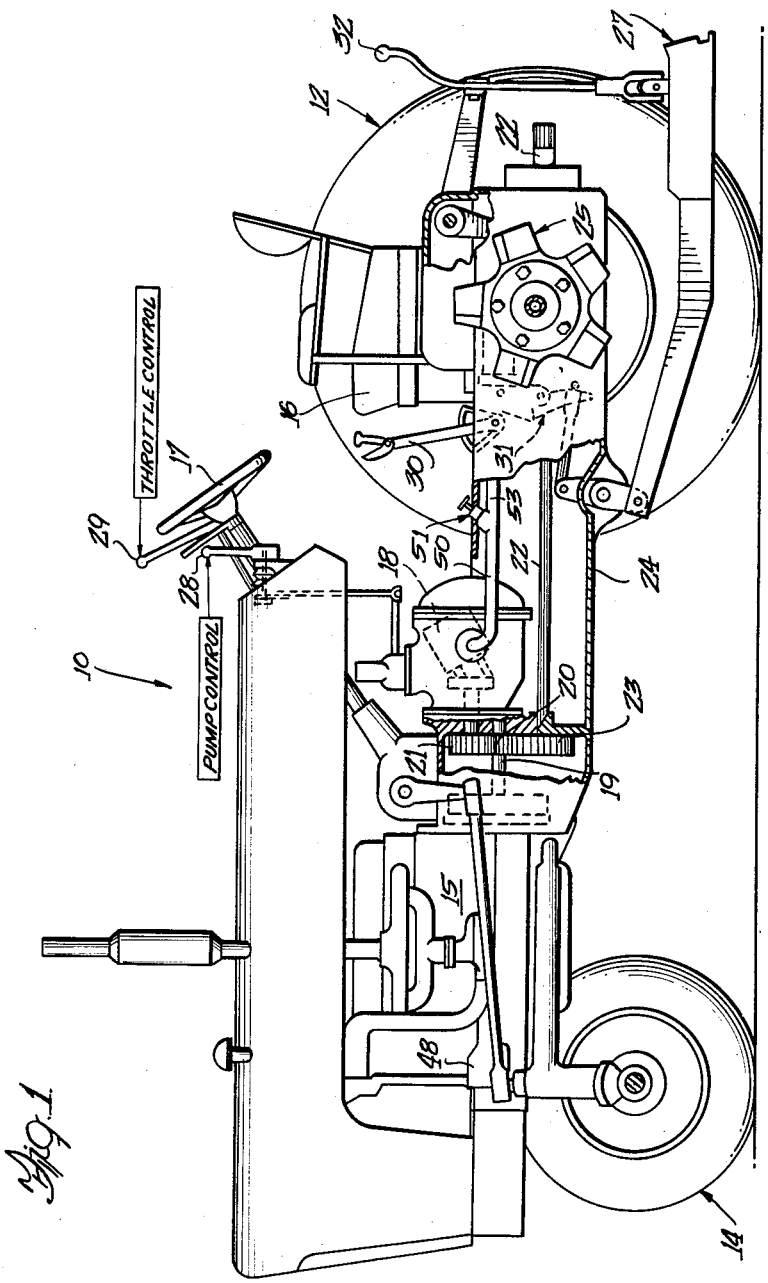
FIGURE 1 is a side elevation of a hydrostatic driven tractor with a front and rear ground engaging wheel removed, partly in section and partly broken away, illustrating a vehicle having a governor mechanism of this invention.

Referring now to FIGURES 1 and 2 the numeral 10 indicates generally tractor having rearwardly disposed ground engaging drive wheels 11 and 12 as well as forwardly disposed steerable wheels 13 and 14. A power plant 15 such as a conventional diesel or gasoline type engine is disposed in the forward portion of the tractor 10 as a source of power for propelling the tractor through the wheels 11 and 12. The tractor 10 also is provided with the usual operator's seat 16 and a manually operable steering wheel 17 for controlling steering movement of the front wheels 13 and 14.

The hydrostatic transmission means for transmitting power from the engine 15 to the rear wheels 11 and 12 generally comprises a conventional variable displacement hydraulic pump 18 driven by the crank shaft 19 of engine 15 either directly connected or optionally through gears 20 and 21 as best shown in FIGURE 1. A conventional power take-off shaft 22 connected to gear 23 in meshed relation may be provided. Mounted on the tractor frame 24 in drive relation with the wheel 11 is a conventional multi-piston type constant displacement hydraulic motor 25. Likewise mounted on the tractor frame is a second hydraulic motor 26, similar to motor 25, in drive relation with the rear wheel 12. A conventional hydraulic type hitch mechanism 27 is provided for connecting the tractor 10 to trailer type implements, such as a plow (not shown) in hitch relation.

Hydraulic fluid from the pump 18 is conducted to and from the motors 25 and 26 through an hydraulic conduit system shown in FIGURE 4 which will be discussed later herein. A manually operated lever 28 is provided for controlling the displacement of the pump 18 thereby governing the speed of the tractor 10 when the engine 15 is operating substantially at constant optimum speed for maximum efficiency. A conventional manually operated throttle control is provided which is operable through the control arm 29. The quadrant shift arm 30 operates a conventional traction control mechanism 31 for regulating the load on the tractor 10 from an implement (not shown) connected to the hitch 27. The crank 32 conventionally controls the levelling of the hitch 27.

The variable displacement hydraulic pump 18 is provided with a pump capacity regulating unit 33 as indicated in FIGURES 1 and 4. The pump 18 with regulating unit is conventional and for example is commercially available type XIP 3000/12 MS made by Joseph Lucas Hydraulic and Combustion Equipment Ltd., of Birmingham, England. Referring to FIGURE 4 the pump 18 essentially comprises a casing 34 having a rotating carrier 35 is provided with a plurality of pistons, two of which are shown at 37 and 38, reciprocable in a longitudinal direction. In effect each of these pistons with the carrier 35 is a hydraulic pump and suitable porting and valve means are provided for inlet and outlet flow of fluid. A cam or swash plate 39 pivotally connected at 40 for transverse rotational movement is provided. The pistons 37, 38 rotate with the carrier 35 about its axis and ride on the face of the cam 39 which actuates reciprocal movement of the pistons thereby pumping fluid from collective port 41 to collective port 42. From FIGURE 4 it is evident that by rotating clockwise the swash plate 39 about its pivot 40 from the maximum displacement position shown decreases the stroke of the pistons 37, 38 thereby correspondingly decreasing the displacement capacity of the pump 18. When the swash plate 39 is rotated to a position normal with respect to the rotational axis of carrier 35, the pistons 37, 38 no longer reciprocate and thus the pump capacity is reduced to zero. Further clockwise movement of the swash plate 39 results in reversed flow of fluid in ports 41 and 42.

It can be appreciated that the force required to maintain in a fixed position or to alter the position of the swash plate 39 is appreciable. For this reason the pump 18 is provided with the regulator unit 33. The unit 33 comprises a piston 43 movable in a transverse direction and connected to the swash plate 39 by a ball and socket joint indicated at 40. The piston 43 is two-way acting. Thus as viewed in FIGURE 4 the piston 43 is pressurized from the top which shifts the swash plate 39 to its maximum displacement position wherein fluid is discharged from the collective port 42 from the pump 18. The unit 33 is provided with a hydraulic valve indicated at 45 actuated by the rod 46. As shown in FIGURE 4 when the rod 46 is urged downwardly the valve 45 opens for admitting fluid under pressure to the chamber 47 thereby driving the piston downwardly. Conversely if the rod 46 is urged upwardly the valve 45 opens to admit fluid pressure below the piston 43 to drive it upwardly. In short the piston 43 and valve unit comprise a power assist in regulating the position of the swash plate 39 corresponding to the position of the rod 46. Details of the hydraulic circuit for actuation of piston 43 are not shown as the pump 18 and its regulating unit 33 are conventional. Of course it should be apparent that if the required force be applied directly to the rod 46 the position of the swash plate 43 may be controlled for regulating the displacement of the pump 18. The piston 43 may be energized from fluid pressure discharged from the pump 18 or a secondary source of fluid pressure as will be explained later.

Referring to FIGURES 1 and 4 there is provided a small constant displacement fluid pump 48 such as a conventional gear pump driven by the engine 15. The small pump 48 provides fluid pressure of the governor circuit for operation of a one-way acting control ram indicated at 49 the function of which will be described later herein. Also the pump 48 provides replenishment fluid in the hydraulic working circuit and regulator unit 33 as will be explained.

The working circuit (FIGURE 4) of the hydrostatic transmission comprises a conduit 50 leading from the collective discharge port 42 of pump 18 into a normally open spring loaded stop valve 51 having a pedal operated actuator 52. From the stop valve 51 fluid pressure is conducted to the inlet side of hydraulic motor 25 through conduit 53 thereby energizing the motor 25. The exhaust fluid from the motor 25 is conducted back to the inlet port 41 of the pump 18 through conduit 54. Also fluid pressure from the port 42 is conducted to a second normally open spring loaded stop valve 55 having a pedal operated actuator 56 through conduit 57. From the stop valve 57 to the inlet side of hydraulic motor 26 thereby energizing the motor 26. The exhaust fluid from the motor 26 is conducted back to the inlet port 41 of the pump 18 through conduit 66. Thus means have been described and shown for energizing the hydraulic motors 25 and 26 from fluid pressure delivered by the pump 18 thereby energizing movement of the tractor 10 in a forward direction.

The purpose of the stop valve 51 is to permit the tractor operator to throttle or terminate energization of motor 25. This permits or assists steering the tractor in sharp turns and when the stop valve 51 is closed the motor 25 is completely de-energized thus permitting pivotal turning about the wheel 11. Fluid leakage from the stop valve 51 is returned to a sump or reservoir through conduits 60 and 61. Likewise stop valve 55 functions with respect to motor 26 as that of stop valve 51. Fluid leakage from stop valve 55 is returned to the sump 59 through conduits 62 and 61 respectively.

In order to prevent damage due to excessive pressure in the conduit 54 during reverse pressure operation of pump 18 the inlet side of a conventional pressure relief valve 63 is connected to the conduit 54 through conduit 50a. The outlet side of the check valve 63 is communicatively connected to sump 59 through conduits 64 and 61 respectively. Similarly the high pressure conduit 57 during forward pressure direction operation of pump 18 is connected to the inlet side of a second conventional pressure relief valve 65 through conduit 57a. The outlet side of check valve 65 is connected to drain conduit 64 through conduit 64a for return to sump 59 through conduits 64 and 61 respectively. For example the valves 63 and 65 may be set to open at 2700 p.s.i. fluid pressure.

As may be understood best from FIGURE 4 it is seen that when the operator moves the lever 28 from the neutral position to the forward position as shown the swash plate 39 assumes the position for driving the tractor 10 in a forward direction at a speed commensurate with the maximum displacement of the pump 18 and speed of the engine 15. When the lever 28 is in the position N the swash plate assumes position normal with respect to axis of carrier 35 and the displacement of pump 18 is zero and thus the motors 25 and 26 are not energized and the tractor 10 is at rest. Obviously when the lever 28 is moved to the reverse position the corresponding displacement of pump 18 is in the reverse flow direction and thus the motors 25 and 26 are energized in reverse direction for moving the tractor backwards. Any intermediate position of the lever 28 from that described regulates the degree of displacement of pump 18 and thereby correspondingly controls the speed of motors 25 and 26 and thus regulates the propelling speed of the tractor.

For the purpose of draining leakage fluid from the motor 25 conduit 67 leading therefrom is provided which is communicatively connected to the sump 59 through conduits 64 and 61 respectively. Since the working circuit is a closed circuit exhaust fluid in conduit 54 is above atmospheric and perhaps as high as for example 100 p.s.i. Likewise a drain line for fluid leakage from motor 26 is provided through conduit 68 communicatively connected to the sump 59 through conduits 64 and 61 respectively. For similar purposes a drain line is provided for pump 18 through conduit 69 communicatively connected to sump 59 through conduits 64 and 61 respectively.

A pedal operated spring loaded normally closed third stop valve 79 of conventional construction is provided. The valve 79 is communicatively connected to conduits 50 and 54 and provides means for emergency de-energizing of motors 25 and 26 by by-passing fluid from the high pressure side to the exhaust side of the working circuit.

Up to this point a conventional form of a hydrostatically driven vehicle has been described in sufficient detail necessary to describe properly the construction and function of the governor mechanism of this invention which description will now be made.

Referring again to FIGURE 4 it will be seen that there is present a secondary or low pressure fluid circuit. The small pump 48 draws fluid from the sump 59 to its inlet side through conduit 70. The discharge side of pump 48 is communicatively connected through conduit 71 to the inlet side of a conventional oil filter 72. The outlet side of filter 72 is communicatively connected to the inlet sides of conventional check valves 73 and 74 in parallel relation through conduits 75 and 76. The outlet side of check valve 73 is communicatively connected to conduit 53 through conduit 53a. The outlet side of check valve 74 is communicatively connected to conduit 66 through conduit 66a. The purpose of check valves 73 and 74 is to permit replenishment of oil in the closed working circuit, above described, lost through leakage flowing in the conduits 67, 68 and 69 also previously described.

A fluid pressure gauge 77 connected to conduit 71 may be provided to observe the fluid pressure magnitude in the secondary fluid circuit. Also the outlet side of a relief valve 78 is connected to the sump 59 through conduit 80 which valve for example may be set to open at 100 p.s.i. This arrangement prevents excessive fluid pressure in the secondary fluid circuit.

The secondary fluid pressure source from the small pump 48 is communicatively connected to the inlet side of a governor control means generally indicated at 81 through conduits 71 and 71a respectively. The governor control means 81 may be a valve provided with two outlets, the first outlet being communicatively connected to conduit 82 leading to the governor controlled power means, generally indicated at 83 which power means will be described later herein. The second outlet of the governor control valve 81 is communicatively connected through conduit 84 to conduit 64 which in turn communicates with sump 59 through conduit 61.

The governor controlled power means above referred to comprises the one-way acting ram 49 having its connecting rod 85 secured to a lost motion member 86. The member 86 is provided with a socket or recess 87 adapted to receive slidably therein a rod 88. From FIGURE 4 it can be seen that as the control ram 49 is energized expansively one end of the rod 88 seats in the lost motion member 86 for driving it rightwardly. The ram 49 may optionally be spring loaded for retraction thereof when de-energized as will be further explained later. The conduit 82 is communicatively connected to the ram 49 for energizing the ram 49 expansively. Interposed in the conduit 82 is a conventional type restriction valve 89 which permits flow of fluid unrestrictively from the conduit 82 into the ram 49 for energization thereof and flows restrictively through the valve 89 to the conduit 82. Thus the valve 89 functions to permit rapid movement of ram 49 expansively but retards the rate of retractive movement.

The other end of rod 88 is pivotally connected at 90 to the upper leg 93 rock arm 91. The rock arm 91 is pivotally mounted at 92 to a stationary part of the vehicle 10 such as the frame thereof. Also connected to the upper leg 93 of rock arm 91 is a tension spring 94 anchored to a stationary part of the vehicle 10. Pivotally connected at 95 to the end portion of the upper leg 93 is a flexible cable 96. The other end of the cable 96 is pivotally connected to the manual control lever 28, the lever 28 being pivotally connected at 97 to a stationary portion of the vehicle 10. The stationary dial 98 may, for convenience, be calibrated in terms of speed such as miles per hour corresponding to the position of lever 28. The dial 98 is provided with a conventional detent device (not shown) adapted to maintain fixedly the position of the lever 28 selected by the operator.

The lower leg 99 is bifurcated at the end thereof to receive slidably the pin 100. The pin 100 projects laterally from lug 101 which lug 101 is rigidly connected to the lower end of rod 46.

From the above it can be seen that the spring 94 urges the rock arm 91 in a direction to move the rod 46 and associated pump capacity regulating unit 33 for obtaining maximum displacement in forward direction of the pump 18. Thus movement in counter-clockwise direction of control lever 28 from the position shown in FIGURE 4 progressively shifts the swash plate 39 from maximum pump displacement in a forward direction, through neutral position to maximum pump displacement in reverse flow direction. The means for shifting the rock arm 91 for altering the displacement of pump 18 by actuation of the governor controlled power means will now be described.

Reference is now made to FIGURE 3 where in the preferred form of the invention the governor control valve 81 is of the solenoid actuated type. A suitable valve 81 is commercially produced by Vickers, Inc., of Detroit, Michigan, as their type "2" two-way. The valve 81 comprises a casing 102 having a longitudinal bore 103 therein closed at its outer end. Within the bore 103 in slidable relation is a plunger 104 integrally connected to the armature 105 of a solenoid 106. A compression spring 107 is disposed in the outer end portion of the bore 103 of the casing 102 and positioned to urge the plunger 104 in a direction to retract the armature 105 of the solenoid 106.

The casing 102 is provided with a first port communicating bore 103 with the conduit 84, a second port communicating bore 103 with the conduit 82 and a third port communicating bore 103 with the conduit 71a. The plunger 104 is provided with a groove 108 which is always in registry with the second port leading to the conduit 82. As shown in FIGURE 3 the solenoid is de-energized and the groove 108 registers to communicate fluid flow from conduit 82 to conduit 84 which latter conduit is in communication with sump 59 as previously explained. In this position the ram 49 retracts and the exhaust fluid therefrom is discharged to the sump 59. When the solenoid 106 is energized the plunger 104 moves rightwardly and the groove 108 moves out of registry with the first port thereby terminating fluid flow in drain conduit 84 but at the same time the groove 108 registers with the third port thereby communicating conduit 71a with conduit 82. The conduit 71a is communicatively connected to the outlet of the small pump 48 as previously explained and illustrated in FIGURE 4. Fluid under pressure from small pump 48 is thus communicated to the ram 49 thereby energizing it expansively. The sensitizing means for energizing the solenoid 81 responsive to the speed of engine 15 will now be described.

Referring to FIGURE 3 there is shown a portion of the carburetor 109 for controlling the fuel supply to the engine 15. It will be understood of course that where the engine 15 is of a different type such as diesel, the carburetor 109 is substituted with conventional fuel control means. The carburetor 109 is provided with the usual fuel control element 110 having a pair of projections 111 and 112 as shown. A stationary stop member 113 is mounted on the barrel 114 of the carburetor 109 adapted to limit rotation of the fuel control element 110 in a clockwise direction corresponding to the position of maximum fuel supply to the engine 15. The projection 112 is provided with an adjustable screw 115 adapted to limit adjustably counter-clockwise movement of control element 110, thus preventing complete closing of fuel supply to the engine 15. This arrangement is conventionally referred to as idling speed adjustment for the engine 15.

Pivotally connected at 116 to the carburetor fuel control element 110 is a carburetor rod 117. Disposed at the other end portion of the rod 117 is a lost motion device 118. The device 118 may comprise a housing 119 having an internal bore or recess 120. Threadedly connected to the housing 119 is a sleeve member 121. Thus the sleeve member 121 is rigidly connected to and moves with the housing 119. Mounted in threaded relation on the sleeve member 121 is a bushing 122 having a flange 123. The sleeve member 121 is provided with an axial bore 124 adapted to receive in slidable relation the carburetor rod 117 as shown in FIGURE 3. A nut 125 is disposed in threaded relation on one end of the rod 117. From the above and FIGURE 3 it can thus be seen that the rod 117 and nut 125 comprise one unitary structure while the housing 119, sleeve 121 and bushing 122 comprise another unitary structure. The rod 117 therefore can move relative to the casing 119 a distance equal to the axial distance between the outer face 126 of the nut 125 and the face 127 of the bore 120 in the housing 119. A tension spring 128 is anchored to a stationary portion of the vehicle and is connected to the carburetor fuel control element 110 urging it in a direction toward maximum throttle position.

The leftward end portion of the housing 119 is provided with a lobe 129 having its outer end pivotally connected at 130 to the actuator lever 131 of a rotational speed responsive mechanism indicated at 132. The mechanism 132 is of conventional construction and for illustrative purposes here is shown to be a centrifugally responsive inertia type, sometimes referred to as a "fly-ball governor." Reference is made to FIGURE 5 showing the details of the fly-ball governor 132. The fly-ball governor 132 may comprise a casing 133 having a shaft 134 journalled for rotation therein. The shaft 134 may either be driven directly from the crankshaft of engine 15 or through suitable gears (not shown) driven by the engine 15 in meshed relation with pinion 135. Mounted on the shaft 134 in axially slidable relation is a sleeve shaft 136 having a pair of integrally connected flanges 137 and 138.

The actuator lever 131 is pivotally mounted on the casing 133 at 139. The lower portion, below the pivot 139, of the actuator lever 131 is a bifurcated element 140 which straddles the sleeve shaft 136. The lower portion of the bifurcated element 140 engages the outer annular surface of the flange 138. A tension spring 141 has one end connected to the actuator lever 131 and the other end connected to a stationary anchor. Alternately the other end of the spring 141 may be connected by suitable link means to the throttle lever control arm 29. This has the effect of urging at variable pressure or force the actuator lever 131 against the bifurcated element 140 into engagement with the flange 138 thereby altering the operating characteristics of the speed responsive mechanism 132 corresponding to the throttle setting.

Within the casing 133 of the mechanism 132 and secured for rotation with shaft 134 is a yoke member 142. Secured to the yoke member 142 in pivotal relation is a plurality of equilaterally spaced inertia elements two of which are shown at 143 and 144. The inertia element 143 is pivotally connected at 145 to the yoke member 142 and is provided with an actuating finger 147 the inner end of which engages the outer face of flange 137. Likewise the inertia element 144 is pivotally connected at 146 to the yoke member 142 and is provided with an actuating finger 148 the inner end of which also engages the outer face of flange 137. From the above it is apparent that as the speed of shaft 134 increases the inertia elements 143 and 144 move about their pivots 145 and 146, respectively, by centrifugal force wherein the fingers 147 and 148 drive the sleeve shaft 136 rightwardly thereby rotating the actuator lever 131 counterclockwise about its pivot 139. When the shaft 134 reduces its speed the inertia elements 144 and 145 have reduced centrifugal force and the spring 141 thus moves the actuator lever in a clockwise direction.

The functional characteristics of the speed responsive mechanism 132 should be chosen for operation commensurate with the optimum operating speed of the engine 15, that is to say, when the speed of the engine 15 is optimum for maximum power output the position of the inertia elements 143 and 144 should be appreciably distant from the position they would assume if the shaft 134 rotated at a speed much in excess of optimum speed. In the position shown in FIGURE 5 the position of inertia elements 143 and 144 corresponding to the minimum operating speed without sensitizing the governor mechanism of this invention for reducing the load applied to the engine 15 which will be explained later herein.

Now referring back to FIGURE 3, a normally open, spring loaded, electric microswitch 149 is mounted stationary on the vehicle 10 such as by mounting plate 150 and bracket 151. In alignment with a switch lever 152 and mounted on the switch 149 is a lever 153 which conveniently may be a strip of spring metal. The electrical circuit of FIGURE 3 comprises a conventional ignition switch 154, ignition coil 155, ignition distributor 156 and signal light 157 all being in primary circuit arrangement with a source of electric energy such as a conventional battery. It will be noted that the solenoid 106 of the governor control valve 81 is electrically energized through leads 159 and 160. Alternatively the ram 49 of the power means 83 may be substituted with a conventional electrically operated linear motor electrically energized in the same manner as fluid valve 81 in which case the micro switch 149 functions as the governor control means.

In operation it will be assumed first that the control lever of FIGURE 4 is in the neutral position and thus the displacement of the pump 18 will be at zero and thus no oil under pressure will be delivered to the motors 25 and 26. Since there is no applied load to the engine 15 it is readily amenable to high speed. However, referring to FIGURE 5, as soon as the engine 15 reaches the optimum speed the inertia elements 143 and 144 function to drive the sleeve shaft 136 rightwardly which in turn moves the actuator lever 131 counterclockwise about its pivot 139. This moves the entire lost motion assembly 118 leftwardly against the urging of both tension springs 128 and 141 thus rotating the carburetor fuel control element in a counterclockwise direction thereby reducing the rate of delivery of fuel to the engine 15. Thus the governor mechanism functions to settle the carburetor fuel control lever 110 at a position required to deliver the correct rate of fuel supply to the engine 15 in order to maintain its speed substantially at a constant optimum speed.

We now assume that the operator desires to operate the vehicle 10 forwardly and further assume that the vehicle 10 is operating on level ground without any implements attached thereto. He moves the control lever 28 to the position A of the dial 98 in FIGURE 4. Immediately, as explained previously, the swash plate 39 of the pump 18 is rotated to the position whereby the pump 18 now is set at one-half its maximum fluid displacement. Fluid under pressure is now delivered simultaneously to motors 25 and 26 through conduits 50, 53 and conduits 57, 58 respectively. The vehicle thus begins to move in a forward direction due to the energizing of the motors 26 and 25. However, the pump 18 now becomes an applied load to the engine 15 and thus reduces its rotational speed. This reduction of speed responsive mechanism 132 which allows tension springs 128 and 141 to move the actuator lever 131 and carburetor fuel control element or throttle 110 in a clockwise direction, thereby increasing the fuel supply to the engine 15. Increase of fuel supply to engine 15 immediately increases its speed until optimum speed is reached at which point the throttle will settle in a similar manner previously described for no-load operation. It will thus be seen that the forward speed of the vehicle 10 is a direct function of the displacement of the pump 18 so long as the applied load to the engine 15 does not reach overload condition which will be described later. Therefore if the vehicle 10 moves downhill the speed of the engine 15 would tend to increase due to load decrease and the governor mechanism automatically would throttle the fuel supply downwardly. Conversely if the vehicle 10 moves uphill the load on the engine 15 correspondingly increases and the governor mechanism responds to automatically increase the throttle.

Now assume that the control lever 28 is in position A as above described but the vehicle 10 is connected to an additional applied load such as, for example, a plow. Let it further be assumed that the plow engages hard ground which imposes a load on the engine 15 so great that the throttle 110 has reached maximum fuel delivery position, as shown in FIGURE 3, and by reason of such load the speed of the engine 15 is reduced below its optimum speed. In other words the power requirement is greater than the maximum power output at optimum speed of the engine 15. When this condition occurs the throttle 110 and its associated rod 117 assumes a stationary position shown in FIGURE 3 which position corresponds to maximum rate of fuel delivery to the engine 15. However, the speed responsive device 132 permits the tension spring 141 to move the actuator lever or arm 131 in a clockwise direction. This moves the housing 119, sleeve member 121 and bushing 122 of the lost motion device 118 in a rightward direction independent of the rod 117 and associated nut 125. The bushing 122 is adjustably positioned on the sleeve member 121 by the threaded connection previously described so that the lost motion magnitude is sufficient for the flange 123 to move the lever 153 rightwardly for actuating the switch lever 152 whereby the switch 149 electrically closes. The signal lamp 157 now illuminates to inform the operator of an overload condition and at the same time solenoid 106 is energized to shift the plunger 104 of the governor control valve 81 to the rightward position for communicating fluid under pressure from the small pump 48 in conduit 71a to conduit 82 and terminating flow in conduit 84. Now referring to FIGURE 4, when conduit 82 is thus communicated with small pump 48 the control ram 49 is immediately energized expansively without restriction from valve 89.

Expansion of the ram 49 now rotates the rockarm 91 clockwise, against the urging of tension spring 94, thus moving the rod 46 upwardly for reducing the displacement of the pump 18 in the manner previously described. Since the cable 96 is flexible the position of the control lever 28 remains unaltered. Reduction of the displacement of the pump 18 correspondingly reduces the applied load on the engine 15 (by reducing the speed of the vehicle 10) and consequently its speed increases. As soon as the speed of engine 15 reaches optimum the speed responsive device 132 actuates the arm 131 thus moving the flange 123 of bushing 122 leftwardly a sufficient distance to permit the microswitch to return to its normal open position which then extinguishes the signal light 157 and de-energizes the solenoid 106 of the governor control valve 81. The plunger 104 of the governor control valve 81 now returns to the position shown in FIGURE 3 whereby the conduit 82 communicates with conduit 84 which permits fluid in the ram 49 to exhaust back to the sump 59. However the rate of flow of exhaust fluid from the ram 49 is diminished by the restrictive valve 89 which thus controls the rate of retraction of ram 49. Thus the tension spring 94 moves the rock arm 91 and rod 46 in the direction, at a retarded rate, to increase the displacement of the pump 18, and thus increase the speed of the tractor to the speed setting of lever 28. This arrangement prevents rapid increase in loading of the engine 15. From the above it is apparent that by careful selection of the components in the governor mechanism of this invention the speed of the engine 15 may always be maintained at the optimum speed and power output with close tolerance above or below, less than ±5% of optimum speed, thereby achieving optimum efficiency.

Obviously if the operator moves the control lever 28 to full speed forward position as shown in FIGURE 3 the governor mechanism of this invention will function in a similar manner except of course the applied load correspondingly increases the power requirements on the engine 15.

In the modified form of the invention shown in FIGURE 5 the governor control valve 81 of FIGURE 3 is replaced by another form of a governor control valve 81'. The valve 81' is of the spool type mounted on the end portion of the speed responsive device 132 and is directly actuated, mechanically, by the sleeve shaft 136. Thus all electrical components are eliminated. The spool 161 is provided with a circumferential groove 162 and a pair of lands 163 and 164. A first port is provided for communicating fluid under pressure from the small pump 48 into the groove 162. A second port is provided for communicating a second circumferential groove 165 with conduit 84 which in turn is in communication with the sump 59 as previously described. Third and fourth ports 166 and 167 are connected communicatively with conduit 82 leading to the ram 49. A fifth port communicatively connects a third circumferential groove 168 with conduit 84a which conduit 84a communicates with the sump 59. The conduit 84a merely functions as a venting means for the groove 168, and drainage occasioned by fluid leakage, whereby the plunger or spool 161 may be freely moved axially. The spool 161 is provided with a generally cylindrical shaped recess 169 adapted to retain a compression spring 170. The spring 170 thus urges the spool 161 in a leftward direction as viewed in FIGURE 5. A small transverse hole 171 is provided in the spool 161 communicating the recess 169 with the groove 168 for venting the cavity or recess 169 containing the spring 170.

In the position shown in FIGURE 5 the land 163 of the spool 161 corresponds to the condition when the engine 15 is rotating at optimum speed. If the applied load on the engine 15 increases to overload condition, the speed of the engine 15 reduces to slightly below optimum and the sleeve shaft 136 of the speed responsive device 132 thereupon moves the spool 161 leftwardly. Port 166 remains covered by the land 163 but the port 167 is opened by leftward movement of land 163 thereby communicating conduit 82 with conduit 71 through the groove 162. Thus fluid under pressure from the small pump 48 is now communicated with the ram 49 which immediately functions to reduce the applied load on the engine 15 by reducing the displacement of the pump 18 as heretofore described. The speed of the engine 15, under reduced load, increases and accordingly the speed responsive device 132 moves the spool 161 rightwardly thereby closing port 167 by the land 163. If the reduction of applied load, as above described, is sufficiently great the speed of the engine 15 will rise to a value slightly above optimum and thus moves the spool 161 further rightwardly to open port 166 thereby communicating conduit 82 with conduit 84. This permits the ram 49 to exhaust its fluid to the sump which of course increases the load on the engine 15 by increasing the displacement of the pump 18.

At this point it should be mentioned that the purpose of stop valves 51 and 55 (FIGURE 4) previously described, are manually operated by the operator. Both of valves 51 and 55 are spring loaded for urging them in a normally open position. When the operator wishes to steer the vehicle in a turning movement, such as for example leftwardly, he can throttle down the fluid delivery to the motor 25 by operation of the stop valve 51. The reduction of fluid delivery to the motor 25 correspondingly increases fluid delivery to the motor 26 thus increasing its rotational speed and thereby assist in turning movement of steering. If the stop-valve 51 is closed completely the motor 25 becomes de-energized and the vehicle 10 pivots about the traction wheel 11 (FIGURE 2). Conversely the stop-valve 55 controls similarly the motor 26 and its traction wheel 12. Another use of the stop valves 51 and 55 is where a large difference occurs in traction between the wheels 11 and 12. An example of this where the wheel 11 encounters ice or mire and thus loses its traction. In such cases, the operator, the motor associated with the wheel on the ice or mire and the other motor then receives the full output from the pump 18. Thus the operator is enabled to distribute the power to the wheel having the best traction advantage.

Having thus described preferred embodiments of the governor mechanism of this invention it can now be seen that the objects of the invention have been fully achieved and it must be understood that changes and modifications may be made which do not depart from the spirit of the invention nor from the scope thereof as defined in the appended claims.

What is claimed is:

1. For a hydrostatic power transmission system having an engine driven variable displacement fluid pump communicatively connected to at least one fluid motor, said engine having a throttle control means, a governor mechanism operatively connected to regulate the speed of said engine substantially at a predetermined constant irrespective of force requirements imposed on said motor comprising a speed responsive device operably connected to said engine, means operatively connecting said speed responsive device to the throttle control of said engine positioned for controlling said throttle when said engine speed exceeds said predetermined speed, a governor controlled power means operatively connected for decreasing displacement of said pump, a governor valve operable responsive to said speed responsive device, said valve being communicatively connected to a source of fluid pressure and said governor controlled power means whereby said valve and power means are actuated by said speed responsive device in a direction to decrease displacement of said pump when the speed of said engine operating at maximum throttle is less than said predetermined speed.

2. For a vehicle propelled by a hydrostatic transmission system having an engine driven variable displacement fluid pump communicatively connected to at least one vehicle propelling fluid motor, said engine having a throttle control means, a governor mechanism operatively connected to regulate the speed of said engine substantially at a predetermined constant irrespective of force requirements imposed on said fluid motor comprising a speed responsive device operably connected to said engine, means operatively connecting said speed responsive device to the throttle control of said engine positioned to shift said throttle downwardly when said engine speed exceeds said predetermined speed, a governor power means operatively connected for decreasing displacement of said pump, a governor valve operable responsive to said speed responsive device, said valve being communicatively connected to a source of fluid pressure and said governor power means whereby said valve and power means are actuated by said speed responsive device in a direction to decrease displacement of said pump when the speed of said engine operating at maximum throttle is less than said predetermined speed.

3. For a vehicle propelled by a hydrostatic transmission system having an engine driven variable displacement fluid pump communicatively connected to at least one vehicle propelling rotary fluid motor, said engine having a throttle control means, a governor mechanism operatively connected to regulate the speed of said engine substantially at a predetermined constant irrespective of torque requirements imposed on said motor comprising a speed responsive device operably connected to said engine, yieldable means operatively connecting said speed responsive device to the throttle control of said engine positioned to shift said throttle downwardly when said engine speed exceeds said predetermined speed, a one-way acting fluid ram operatively connected for decreasing displacement of said pump, a source of fluid pressure communicatively connectable to said ram, and a governor valve actuated by said speed responsive device interposed operatively between said source of fluid pressure and said ram whereby said valve is actuated by said speed responsive device to energize said ram in a direction to decrease displacement of said pump when the speed of said engine operating at maximum throttle is less than said predetermined speed.

4. For a vehicle propelled by a hydrostatic transmission system having an engine driven variable displacement fluid pump communicatively connected to at least one vehicle propelling rotary fluid motor, said engine having a throttle control means, a governor mechanism operatively connected to regulate the speed of said engine substantially at a predetermined constant irrespective of torque requirements imposed on said fluid motor comprising a speed responsive device operably connected to said engine, yieldable means operatively connecting said speed responsive device to the throttle control of said engine positioned to shift said throttle downwardly when said engine speed exceeds said predetermined speed and upwardly when said engine speed is less than said predetermined speed, a one-way acting ram operatively connected for decreasing displacement of said pump, a source of fluid pressure communicatively connectable to said ram, a governor valve interposed operatively between said source of fluid pressure and said ram, and means connecting said valve and said speed responsive device in operable relation whereby said valve is actuated in one direction to energize said ram in a direction to decrease displacement of said pump when the speed of said engine operating at maximum throttle is less than said predetermined speed and said valve being actuated in the other direction for de-energizing said ram when the speed of said engine elevates to said predetermined speed.

5. For a vehicle propelled by a hydrostatic transmission system having an engine driven variable displacement pump communicatively connected to at least one vehicle propelling rotary fluid motor, said engine having a throttle control means, a governor mechanism operatively connected to regulate the speed of said engine substantially at a predetermined constant irrespective of torque requirements imposed on said fluid motor comprising a speed responsive device operably connected to said engine, yieldable means operatively connecting said speed responsive device to the throttle control of said engine positioned to shift said throttle downwardly when said engine speed exceeds said predetermined speed and upwardly when said engine speed is less than said predetermined speed, a one-way acting ram operatively connected for decreasing displacement of said pump, a source of fluid pressure communicatively connectable to said ram, a governor valve interposed operatively between said source of fluid pressure and said ram, means connecting said valve and said speed responsive device in operable relation whereby said valve is actuated in one direction to energize said ram in a direction to decrease displacement of said pump when the speed of said engine operating at maximum throttle is less than said predetermined speed and said valve being actuated in the other direction for de-energizing said ram when the speed of said engine elevates to said predetermined speed, and adjustable means positioned to urge upwardly the displacement of said pump to a predetermined value for limiting speed of said fluid motor.

6. For a vehicle propelled by a hydrostatic transmission system having an engine driven variable displacement pump communicatively connected to at least one vehicle propelling rotary fluid motor, said engine having a throttle control means, a governor mechanism operatively connected to regulate the speed of said engine substantially at a predetermined constant irrespective of torque requirements imposed on said fluid motor comprising a speed responsive device operably connected to said engine, yieldable means operatively connecting said speed responsive device to the throttle control of said engine positioned to shift said throttle downwardly when said engine speed exceeds said predetermined speed and upwardly when said engine speed is less than said predetermined speed, a one-way acting ram operatively connected for decreasing displacement of said pump, a source of fluid pressure communicatively connectable to said ram, a solenoid actuated governor valve interposed operatively between said source of fluid pressure and said ram, a source of electric energy connectable to said solenoid, a spring loaded normally open electric switch, means operably connected to actuate said switch responsive to said speed responsive device whereby said solenoid is energized to actuate said valve for communicating said source of fluid pressure to move said ram in one direction to decrease displacement of said pump when the speed of said engine at maximum throttle is less than said predetermined speed and said solenoid being de-energized responsive to said speed responsive device and said switch for terminating flow of fluid under pressure to said ram and simultaneously opening fluid discharge means for allowing said ram to move in the other direction when the speed of said engine elevates to said predetermined speed, and adjustable resilient means positioned to urge upwardly the displacement of said pump to a predetermined value for limiting speed of said fluid motor.

7. For a vehicle propelled by a hydrostatic transmission system having an engine driven variable displacement pump communicatively connected to at least one vehicle propelling rotary fluid motor, said engine having a throttle control means, a governor mechanism operatively connected to regulate the speed of said engine substantially at a predetermined constant irrespective of torque requirements imposed on said fluid motor comprising an inertia type centrifugally responsive rotational speed responsive device operably connected to said engine, yieldable means operatively connecting said speed responsive device to the throttle control of said engine positioned to shift said throttle downwardly when said engine speed exceeds said predetermined speed and upwardly when said engine speed is less than said predetermined speed, a one-way acting ram operatively connected for decreasing displacement of said pump, a source of fluid pressure communicatively connectable to said ram, a governor valve mounted adjacent said speed responsive device, said valve being communicatively connected to said source of fluid pressure and said ram, link means operatively positioned to actuate said governor valve responsive to said speed responsive device whereby said valve is actuated for communicating said source of fluid pressure to move said ram in one direction to decrease displacement of said pump when the speed of said engine at maximum throttle is less than said predetermined speed and said valve being de-actuated responsive to said speed responsive device for terminating flow of fluid under pressure to said ram and simultaneously opening fluid discharge means for allowing said ram to move in the other direction when the speed of said engine elevates to said predetermined speed, and adjustable resilient means positioned to urge upwardly the displacement of said pump to a predetermined value for limiting speed of said motor.

8. For a vehicle propelled by a hydrostatic transmission system having an engine driven variable displacement pump communicatively connected to at least one vehicle propelling rotary fluid motor, a governor mechanism operatively connected to decrease progressively the displacement of said pump when the speed of said engine is less than a predetermined speed comprising a speed responsive device operably connected to said engine, a one-way acting ram operatively connected for decreasing displacement of said pump, a source of fluid pressure communicatively connectable to said ram, a governor valve interposed between said source of fluid pressure and said ram, means connecting said valve and said speed responsive device in operable relation whereby said valve is actuated in one direction to energize said ram in a direction to decrease displacement of said pump when the speed of said engine is less than said predetermined speed and said valve being actuated in the other direction for de-energizing said ram when the speed of said engine elevates to said predetermined speed, and adjustable resilient means positioned to urge upwardly the displacement of said pump to a predetermined value for limiting the speed of said fluid motor.

9. For a vehicle propelled by a hydrostatic transmission system having an engine driven variable displacement pump communicatively connected to at least one vehicle propelling rotary fluid motor, a governor mechanism operatively connected to decrease progressively the displacement of said pump when the speed of said engine is less than a predetermined speed comprising a speed responsive device operably connected to said engine, a one-way acting ram operatively connected for decreasing displacement of said pump, a source of fluid pressure communicatively connectable to said ram, a solenoid actuated governor valve interposed operatively between said source of fluid pressure and said ram, a source of electric energy connectable to said solenoid, a spring loaded normally open electric switch, means operably connected to actuate said switch responsive to said speed responsive device whereby said solenoid is energized to actuate said valve for communicating said source of fluid pressure to move said ram in one direction to decrease displacement of said pump when the speed of said engine is less than said predetermined speed and said solenoid being de-energized responsive to said speed responsive device and said switch for terminating flow of fluid under pressure to said ram and simultaneously opening fluid discharge means for allowing said ram to move in the other direction when the speed of said engine elevates to said predetermined speed, and adjustable resilient means positioned to urge upwardly the displacement of said pump to a predetermined value for limiting speed of said fluid motor.

10. For a vehicle propelled by a hydrostatic transmission system having an engine driven variable displacement fluid pump communicatively connected to at least one vehicle propelling rotary fluid motor, a governor mechanism operatively connected to decrease progressively the displacement of said pump when the speed of said engine is less than a predetermined speed comprising an inertia type centrifugally operable rotational speed responsive device operably connected to said engine, a one-way acting ram operatively connected for decreasing displacement of said pump, a source of fluid pressure communicatively connectable to said ram, a governor valve, said valve mounted adjacent said speed responsive device, said valve being communicatively connected to said source of fluid pressure and said ram, link means connected to actuate said governor valve responsive to said speed responsive device whereby said valve is actuated for communicating said source of fluid pressure to move said ram in one direction to decrease displacement of said pump when the speed of said engine is less than said predetermined speed and said valve being de-actuated responsive to said speed responsive device for terminating flow of fluid under pressure to said ram and simultaneously opening fluid discharge means for allowing said ram to move in the other direction when the speed of said engine elevates to said predetermined speed, and adjustable resilient means positioned to urge upwardly the displacement of said pump to a predetermined value for limiting the speed of said fluid motor.

References Cited in the file of this patent

UNITED STATES PATENTS

| | | |
|---|---|---|
| 2,326,821 | Boyle | Aug. 17, 1943 |
| 2,500,580 | Segsworth | Mar. 14, 1950 |
| 2,941,365 | Carlson et al. | June 21, 1960 |